US010409714B1

United States Patent
Shah et al.

(10) Patent No.: US 10,409,714 B1
(45) Date of Patent: Sep. 10, 2019

(54) LOGICAL TO PHYSICAL TRANSLATION FOR TWO-TERMINAL MEMORY

(71) Applicant: Crossbar, Inc., Santa Clara, CA (US)

(72) Inventors: Ruchirkumar Shah, San Jose, CA (US); Mehdi Asnaashari, Danville, CA (US)

(73) Assignee: Crossbar, Inc., Santa Clara, CA (US)

( * ) Notice: Subject to any disclaimer, the term of this patent is extended or adjusted under 35 U.S.C. 154(b) by 90 days.

(21) Appl. No.: 15/428,721

(22) Filed: Feb. 9, 2017

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ............ G06F 12/0246; G06F 12/0292; G06F 12/1009; G06F 12/1072; G06F 2212/7201
See application file for complete search history.

(56) References Cited

U.S. PATENT DOCUMENTS

| | | | |
|---|---|---|---|
| 2004/0083335 A1 | 4/2004 | Gonzalez et al. | |
| 2007/0208904 A1 | 9/2007 | Hsieh et al. | |
| 2009/0248962 A1 | 10/2009 | Kim et al. | |
| 2010/0037001 A1* | 2/2010 | Langlois | G06F 12/0246 711/103 |
| 2011/0231610 A1* | 9/2011 | Yano | G06F 12/0246 711/118 |
| 2012/0311238 A1 | 12/2012 | Im | |
| 2013/0051123 A1 | 2/2013 | Lee et al. | |
| 2014/0089565 A1 | 3/2014 | Lee et al. | |
| 2014/0095827 A1* | 4/2014 | Wei | G06F 12/0246 711/203 |
| 2014/0181434 A1* | 6/2014 | Chau | G06F 12/16 711/162 |
| 2015/0254177 A1* | 9/2015 | Ikeda | G06F 12/1009 711/148 |
| 2016/0048448 A1* | 2/2016 | Kwon | G06F 12/0246 711/103 |
| 2016/0118136 A1* | 4/2016 | Tseng | G11C 16/3495 365/185.03 |
| 2017/0242583 A1* | 8/2017 | Yang | G06F 3/061 |
| 2017/0293525 A1 | 10/2017 | Kanno et al. | |

OTHER PUBLICATIONS

Non-Final Office Action received for U.S. Appl. No. 15/426,298 dated Jun. 6, 2018, 16 pages.
Notice of Allowance dated Nov. 19, 2018 for U.S. Appl. No. 15/426,298, 7 pages.

* cited by examiner

*Primary Examiner* — Tracy A Warren
(74) *Attorney, Agent, or Firm* — Wegman, Hessler

(57) ABSTRACT

One potential result of differing characteristics for certain two-terminal memory (TTM) is that memory management techniques, such as logical-to-physical (L2P), can differ as well. Previous memory management techniques do not adequately leverage the advantages associated with TTM. For example, by identifying and leveraging certain advantageous characteristics of TTM, L2P tables can be designed to be smaller and more efficient, which can allow the L2P table to be stored in memory that is faster and/or closer (or integrated into) an associated controller. Moreover, other memory management operations such as wear-leveling, recovery from power loss, and so forth, can be more efficient.

19 Claims, 9 Drawing Sheets

LOGICAL TO PHYSICAL TRANSLATION FOR TWO-TERMINAL MEMORY

INCORPORATION BY REFERENCE

The following are hereby incorporated by reference in their entireties and for all purposes. U.S. patent application Ser. No. 14/588,185, filed Dec. 31, 2014, U.S. patent application Ser. No. 11/875,541 filed Oct. 19, 2007, U.S. patent application Ser. No. 12/575,921 filed Oct. 8, 2009, U.S. patent application Ser. No. 14/636,363 filed Mar. 3, 2015, and U.S. patent application Ser. No. 15/426,298 filed Feb. 7, 2017.

TECHNICAL FIELD

This disclosure generally relates to logical-to-physical (L2P) translation techniques in connection with two-terminal memory such as resistive-switching memory.

BACKGROUND

Two-terminal, resistive-switching memory represents a recent innovation within the field of integrated circuit technology. While much of resistive-switching memory technology is in the development stage, various technological concepts for resistive-switching memory have been demonstrated by the inventor(s) and are in one or more stages of verification to prove or disprove associated theories or techniques. The inventor(s) believe that resistive-switching memory technology shows compelling evidence to hold substantial advantages over competing technologies in the semiconductor electronics industry.

The inventor(s) believe that resistive-switching memory cells can be configured to have multiple states with distinct resistance values. For instance, for a single bit cell, the restive-switching memory cell can be configured to exist in a relatively low resistance state or, alternatively, in a relatively high resistance state. Multi-bit cells might have additional states with respective resistances that are distinct from one another and distinct from the relatively low resistance state and the relatively high resistance state. The distinct resistance states of the resistive-switching memory cell represent distinct logical information states, facilitating digital memory operations. Accordingly, the inventor(s) believe that arrays of many such memory cells, can provide many bits of digital memory storage.

The inventor(s) have been successful in inducing resistive-switching memory to enter one or another resistive state in response to an external condition. Thus, in transistor parlance, applying or removing the external condition can serve to program or de-program (e.g., erase) the memory. Moreover, depending on physical makeup and electrical arrangement, a resistive-switching memory cell can generally maintain a programmed or de-programmed state. Maintaining a state might require other conditions be met (e.g., existence of a minimum operating voltage, existence of a minimum operating temperature, and so forth), or no conditions be met, depending on the characteristics of a memory cell device.

The inventor(s) have put forth several proposals for practical utilization of resistive-switching technology to include transistor-based memory applications. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors.

In light of the above, the inventor(s) desire to continue developing practical utilization of resistive-switching technology.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

The subject disclosure provides for a memory device comprising a controller that is operatively coupled to a first memory and a second memory. The first memory can comprise an array of non-volatile two-terminal memory cells. The second memory can comprise volatile memory. The controller can provide logical-to-physical (L2P) mapping in response to translating a first memory address to a second memory address. The first memory address can be characterized as a logical address and the second memory address can be characterized as a physical address of the first memory. The second memory can comprise an L2P table. The L2P table can comprise a first set of physical group identifiers, wherein a physical group identifier (PGI) of the set of PGIs can identify a physical group (PG) of the first memory with each block being one or more pages of memory. The PG can have a group size characterized as a number of blocks in the PG. The blocks in the PG can be grouped according to a defined striping profile. The L2P table can further comprise a second set of logical group identifiers that can map to the first set of PGIs. A logical group identifier (LGI) of the set of LGIs can identify a logical group (LG) having the number of consecutive logical blocks of data.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

DETAILED DESCRIPTION

Introduction to Two-Terminal Memory

Figure 1:
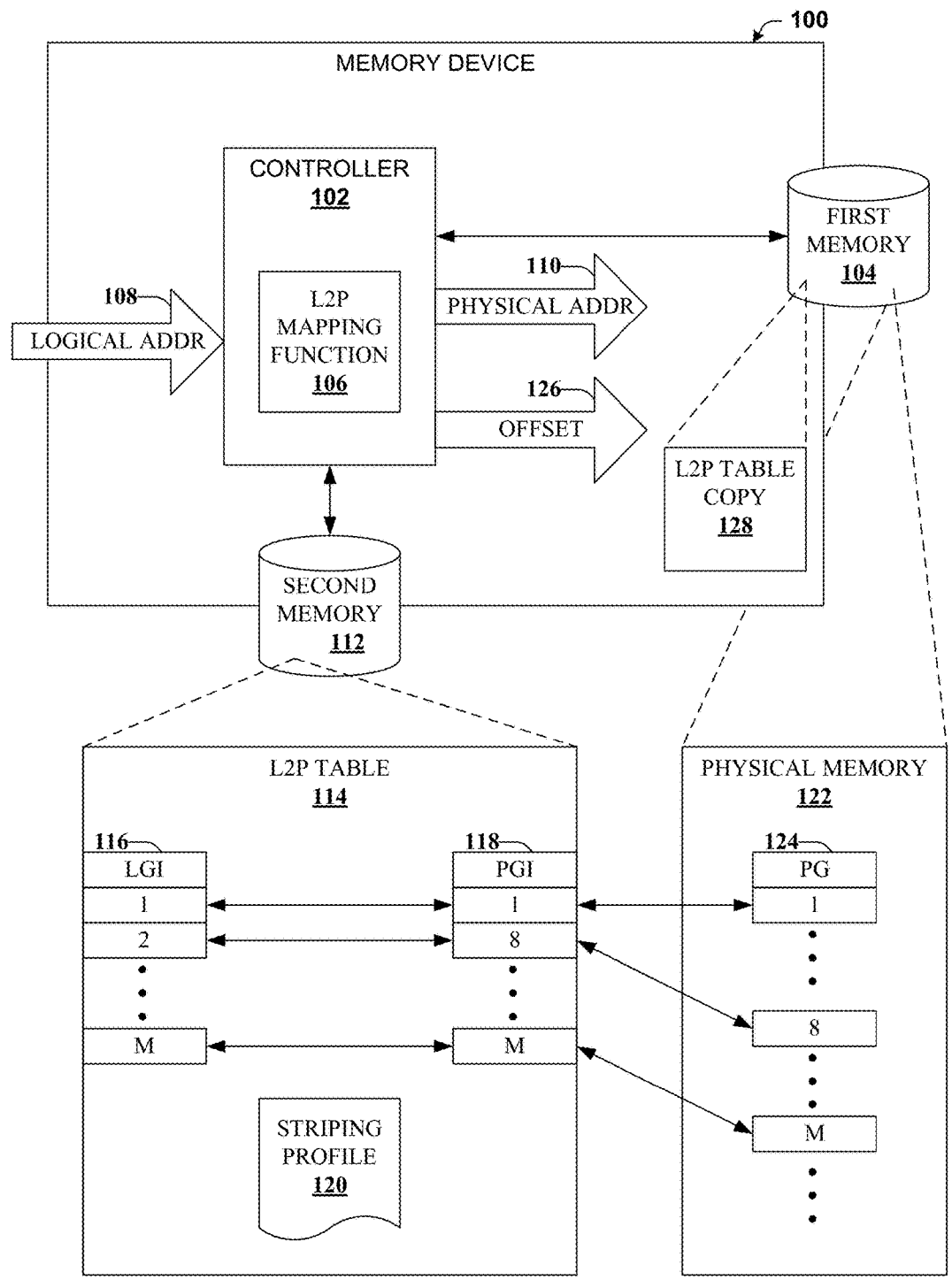
FIG. 1 illustrates a block diagram of a system that provides for a thin and efficient logical-to-physical (L2P) mapping in accordance with certain embodiments of this disclosure.

This disclosure relates to two-terminal memory cells employed for digital or multi-level information storage. In some embodiments, the two-terminal memory cells can include a resistive technology, such as a resistive-switching two-terminal memory cell. Resistive-switching two-terminal memory cells (also referred to as resistive-switching memory cells or resistive-switching memory), as utilized herein, comprise circuit components having conductive contacts (e.g., electrodes or terminals) with an active region between the two conductive contacts. The active region of the two-terminal memory device, in the context of resistive-switching memory, exhibits a plurality of stable or semi-stable resistive states, each resistive state having a distinct electrical resistance. Moreover, respective ones of the plurality of states can be formed or activated in response to a suitable electrical signal applied at the two conductive contacts. The suitable electrical signal can be a voltage value, a current value, a voltage or current polarity, or the like, or a suitable combination thereof. Examples of a resistive switching two-terminal memory device, though not exhaustive, can include a resistive random access memory (RRAM), a phase change RAM (PCRAM) and a magnetic RAM (MRAM). In various embodiments, one or more additional layers (e.g., blocking layer(s), adhesion layer(s), tunneling layer(s), ohmic contact layer(s), etc., or a suitable combination thereof) can be provided as part of the resistive-switching two-terminal memory cells, whether between the two conductive contacts, external to the conductive contacts or a suitable combination thereof.

Embodiments of the subject disclosure can provide a filamentary-based memory cell. In some embodiments, the filamentary-based memory cell includes a non-volatile memory device, whereas other embodiments provide a volatile selector device in electrical series with the non-volatile memory device. In further embodiments, both the volatile selector device and the non-volatile memory device can be filamentary-based devices, though the subject disclosure is not limited to these embodiments.

One example of a filamentary-based device can comprise: a conductive layer (e.g., comprising, e.g., TiN, TaN, TiW, metal compounds), an optional interface layer (e.g., doped p-type (or n-type) silicon (Si) bearing layer (e.g., p-type or n-type polysilicon, p-type or n-type polycrystalline SiGe, etc.)), a resistive switching layer (RSL) and an active metal layer capable of being ionized. Under suitable conditions, the active metal layer can provide filament forming ions to the RSL. In such embodiments, a conductive filament (e.g., formed by the ions) can facilitate electrical conductivity through at least a subset of the RSL, and a resistance of the filament-based device can be determined by a tunneling resistance (or, e.g., ohmic contact resistance) between the filament and the conductive layer. To reverse electrical conductivity resulting from the conductive filament, whether for the volatile selector device or the non-volatile memory device (with the exception of one-time programmable memory devices), the filament can be deformed. In some embodiments, deformation of the filament can comprise the particles (e.g., metal ions)—trapped within the defect locations—becoming neutral particles (e.g., metal atoms) in absence of the bias condition that have a high electrical resistance. In other embodiments, deformation of the filament can comprise dispersion (or partial dispersion) of the particles within the RSL, breaking a conductive electrical path provided by the filament in response to the bias condition. In still other embodiments, deformation of the filament can be in response to another suitable physical mechanism, or a suitable combination of the foregoing.

Generally, deformation of a conductive filament results from a change in the bias conditions to a second set of bias conditions. The second set of bias conditions can vary for different devices. For instance, deformation of a conductive filament formed within the volatile selector device can be implemented by reducing an applied bias below a formation magnitude (or small range of magnitudes, such as a few tens of a volt) associated with filament formation within the volatile selector device. Depending on the embodiment, a conductive filament can be created within a volatile selector device in response to a positive bias (e.g., forward bias) or in response to a negative bias (e.g., reverse bias), and deformation of the filament can occur in response to a suitable lower-magnitude positive bias or a suitable lower-magnitude negative bias, respectively. See U.S. patent application Ser. No. 14/588,185 filed Dec. 31, 2014 commonly owned by the assignee of the present application, and incorporated by reference herein in its entirety and for all purposes. In contrast, deformation of a conductive filament formed within the non-volatile memory device can be implemented by providing a suitable erase bias (e.g., a reverse bias), having opposite polarity from a program bias (e.g., forward bias) utilized to form the conductive filament within the non-volatile memory device.

In various embodiments of a memory cell of the present disclosure, a conductive layer may include titanium nitride (TiN), tantalum nitride (TaN), tungsten (W) or the like. The RSL (which can also be referred to in the art as a resistive switching media (RSM)) can comprise, e.g., an undoped amorphous Si layer, a semiconductor layer having intrinsic characteristics, a silicon nitride (e.g. SiN, Si3N4, SiNx, etc.), a Si sub-oxide (e.g., SiOx wherein x has a value between 0.1 and 2), a Si sub-nitride, a metal nitride, a non-stoichiometric silicon compound, and so forth. Other examples of materials suitable for the RSL could include $Si_XGe_YO_Z$ (where X, Y and Z are respective suitable positive numbers), a silicon oxide (e.g., $SiO_N$, where N is a suitable positive number), an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, or a suitable combination thereof. In various embodiments, the RSL includes a number of material voids or defects to trap or hold particles in place, in the absence of an external program stimulus causing the particles to drift within the RSL and form the conductive filament. For the non-volatile memory device then, the particles can remain trapped in the absence of the external program stimulus, requiring a suitable reverse bias (e.g., a negative polarity erase stimulus) to drive the particles out of the voids/defects, or otherwise break continuity of the conductive filament, thereby deforming the conductive filament.

The contact material layer can be comprised of any suitable conductor, such as a conductive metal, a suitably doped semiconductor, or the like. Where utilized, the contact material layer can be employed to provide good ohmic contact between the RSL and a metal wiring layer of an associated memory architecture. In some embodiments, the contact material layer can be removed and the RSL can be in physical contact with a metal wiring layer. Suitable metal wiring layers can include copper, aluminum, tungsten, platinum, gold, silver, or other suitable metals, suitable metal alloys, or combinations of the foregoing. In further embodiments, a diffusion mitigation layer or adhesion layer can be provided between the RSL and the metal wiring layer (or between the RSL and the contact material layer).

Examples of the active metal layer can include, among others: silver (Ag), gold (Au), titanium (Ti), titanium nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), and palladium (Pd), a suitable nitride of one or more of the foregoing, or a suitable oxide of one or more of the foregoing. Other suitable conductive materials, as well as compounds or combinations of the foregoing or similar materials can be employed for the active metal layer in some aspects of the subject disclosure. In some embodiments, a thin layer of barrier material composed of Ti, TiN, or the like, may be disposed between the RSL and the active metal layer (e.g., Ag, Al, and so on). Details pertaining to additional embodiments of the subject disclosure similar to the foregoing example(s) can be found in the following U.S. patent applications that are licensed to the assignee of the present application for patent: application Ser. No. 11/875,541 filed Oct. 19, 2007, application Ser. No. 12/575,921 filed Oct. 8, 2009, and the others cited herein, each of which are incorporated by reference herein in their respective entireties and for all purposes.

In response to a suitable program stimulus (or set of stimuli) a conductive path or a filament of varying width and length can be formed within a relatively high resistive portion of a non-volatile memory device (e.g., the RSL). This causes a memory cell associated with the non-volatile memory device to switch from a relatively high resistive state, to one or more relatively low resistive states. In some resistive-switching devices, an erase process can be implemented to deform the conductive filament, at least in part, causing the memory cell to return to the high resistive state from the low resistive state(s), as mentioned previously. This change of state, in the context of memory, can be associated with respective states of a binary bit or multiple binary bits. For an array of multiple memory cells, a word(s), byte(s), page(s), etc., of memory cells can be programmed or erased to represent zeroes or ones of binary information, and by retaining those states over time in effect storing the binary information. In various embodiments, multi-level information (e.g., multiple bits) may be stored in respective memory cells.

L2P Translation Overview

Today, many non-volatile memory markets are dominated by NAND Flash memory, hereinafter referred to as flash memory. Flash memory (e.g., three-terminal memory) has many characteristics that are different from certain two-terminal memory detailed herein. One potential result of differing characteristics is that memory management techniques, such as logical-to-physical (L2P), can differ as well between flash memory and two-terminal memory. While parts of this disclosure focus on L2P translation, it is understood that techniques detailed herein can also apply to physical-to-logical translation as well.

One notable differing characteristic between flash memory and two-terminal memory relates to in-place overwrite of data, which is supported by some types of two-terminal memory, but not supported by flash memory. Due to disturb errors or other issues, a block of flash memory generally must be erased first before writing data to any page of memory in that block. Additionally, wear leveling algorithms employed for flash memory typically add additional write operations as data is moved from high-use blocks to low-use blocks. Such measures can result in a write amplification (WA) factor of 3×. At a write amplification of 3×, each high level write instruction generally requires three low-level operations (e.g., a move operation, an erase operation, and a write operation) resulting generally in three times the wear on the memory. Such can dramatically affect memory endurance.

Since flash memory has dominated the marketplace, traditional memory management techniques, including L2P translation, has been designed based on the characteristics of flash memory. For example, the consequence of a 3× WA has lead to a large over-provisioning (OP) in order to mitigate the 3× WA. Large OP causes capacity reduction since a significant portion of the total memory is allocated to OP instead of representing usable memory.

One significant use of L2P translation is to provide wear leveling as well as other memory management elements. Wear leveling typically seeks to evenly spread wear (e.g., a number of memory operations such as writing or erasing) among the usable memory. Because flash memory does not support overwrites, etc., conventional memory management schemes must support not only static wear leveling (SWL), but also dynamic wear leveling (DWL). Traditional schemes can suffer from a substantial performance degradation due to DWL. Such can be caused by garbage collection procedures, a so-called 'write cliff', or other inconsistent performance issues.

Moreover, traditional flash memory management techniques generally require a large system footprint for FTL management. For example, a large amount of memory is needed for maintaining FTL tables. As one example, the FTL table can require an entry for each 4 kB of data.

Previous techniques can further require very complex design to maintain the tables during power failure or, additionally or alternatively rely on super capacitors, battery backup, or NVDIMM.

In contrast, certain types of two-terminal memory can provide beneficial characteristics that can be leveraged to reduce the demands of memory management such as the demands caused by L2P translation, wear leveling, table maintenance during power failure, and so on. For example, certain types of two-terminal memory can have an endurance (e.g., an average number of write cycles before failure) of 100K or more. Such memory can also support overwrite capabilities, so erase operations are not required. Such memory can further support very low read latency (e.g., about one microsecond or less) and low write time (e.g., about two microseconds or less).

Certain two-terminal memory (TTM), such as filamentary-based, resistive-switching memory, represents an innovative class of non-volatile storage. In some embodiments, such has many beneficial attributes compared to flash memory, which currently dominates many memory markets. In some embodiments, TTM can provide very fast read and write times, small page sizes, in-place writes, and high endurance. Even though the endurance of TTM is high compared to flash memory, the endurance is not so remarkably high that in practical use benefits cannot be obtained by using some form of wear leveling. Further, storage system that use TTM can benefit from other memory management features like data integrity across power cycles, detecting, anticipating, and/or managing various memory failures, and so forth.

This disclosure proposes a set of techniques to manage TTM storage systems. In some embodiments, largely due to certain advantages of TTM over other types of memory, the management layer can be very thin both in terms of computational and memory resources, while still effectively providing various benefits normally associated with much larger management layers such as, e.g., L2P translation, wear leveling, power failure recovery, and so on.

Since TTM supports in-place overwrite of data, DWL and garbage collection are not required. Such by itself represents a significant reduction that can be realized for memory management overhead. However, TTM can still benefit from efficient SWL, e.g., to ensure wear is spread across the available memory. As with many other elements of memory management, implementation of SWL relies on L2P translation.

In order to realize efficient L2P translation and to other related ends, consecutive logical blocks (LB) of memory can be grouped into a logical group (LG). Logical groups can be of substantially any size and that size is not necessarily dependent on a physical layout of a device. A LB can be mapped to a physical block (PB) that represents one or more pages of a physical memory location in the TTM. As used herein a block, e.g., a LB or PB, can represent an addressable unit of data such as a page of memory or a collection of pages. In some embodiments, LB and PB represent same unit of data. A group of PBs can be grouped together form a physical group (PG) that corresponds to an associated LG. There need not be any restriction on how the PG is defined. For example, PBs of a given PG can be in a single bank of memory, on a single chip of memory, can span multiple chips of memory, or even span multiple channels (e.g., to enable parallelism elements). In some embodiments, PBs of a PG corresponds to the way data of logical pages is stripped across the physical pages.

Generally, a group size (e.g., a number of blocks in a group) can be configurable, but typically is the same for physical groups and logical groups. Typically, each LG is mapped to a corresponding PG. An L2P translation table can be employed to map a given LG to a corresponding PG. The L2P table can be kept in volatile memory for fast access. Moreover, this L2P table can have significantly fewer entries than previous translation tables such as those associated with flash memory. In other words, the L2P table can have one entry per group of blocks instead of one or more entries per page of flash memory, which can reduce the size of the L2P table over other systems as substantially a function of group size. Due to a smaller size, the L2P table can be kept in volatile memory inside the controller, whereas in embodiments using flash memory, an external memory component such as DRAM is typically required to accompany the controller which increases the cost of the system and its power consumption and reduces the performance. The L2P table can further be stored in TTM (e.g., non-volatile) to enable recovery, such as after a power failure or interruption. In some embodiments, the L2P can be kept on a non-volatile memory embedded in the controller.

In some embodiments, the group size of LGs and PGs can be static and same across the entire storage system. In some embodiments, the storage system can be divided into multiple partitions and the group size of LGs and PGs can be static but differ between different partitions. For example, a first partition of the available non-volatile memory can have one static group size whereas a second partition can have a different static group size. In some embodiments, the first partition and the second partition can have dynamic group sizes that can be same or different and can be determined and/or updated in situ and/or in operation based on traffic patterns or other suitable parameters.

Example L2P Translation Systems

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring initially to FIG. 1, memory device 100 is depicted that provides for a thin and efficient logical-to-physical (L2P) mapping. For example, memory device 100 can comprise controller 102. Controller 102 can be operatively coupled to first memory 104. First memory 104 can comprise an array of non-volatile two-terminal memory cells. In some embodiments, all or a portion of first memory 104 can be physically located within memory device 100. In some embodiments, all or a portion of first memory 104 can be remote from memory device 100. Controller 102 can comprise L2P mapping function 106 that can facilitate translating a logical memory address 108 to a physical memory address 110. Logical memory address 108 can be characterized as a logical address of data of a logical data space. Physical memory address 110 can be characterized as an address corresponding to physical memory 122 of first memory 104.

Controller 102 can further be operatively coupled to second memory 112. Second memory 112 can comprise volatile or non-volatile memory. For example, second memory 112 can have static random access memory (SRAM)-like characteristics, or can be implemented as a combination of SRAM and dynamic random access memory (DRAM) that are volatile or magnetoresistive random access memory (MRAM) that is very fast and non-volatile. In some embodiments, second memory 112 can be implemented as resistive random access memory (RRAM) and particularly one-transistor-one-resistor (1T1R) RRAM which are very fast. A 1T1R RRAM implementation can be advantages as, in some embodiments of the disclosed subject matter, updates do not happen as often and as such, endurance of about 100K and using range program time should be sufficient in this application. A one-transistor-many-resistor (1TnR) RRAM typically has a longer read access time, which could cause performance issues. In the case of 1T1R, the memory can be monolithically integrated into the controller as well.

In some embodiments, all or a portion of second memory 112 can be included in memory device 100 and/or controller 102. The volatile memory of second memory 112 can store L2P table 114. L2P table 114 can comprise a first set of physical group identifiers (PGIs), which can be referenced herein, either individually or collectively, as PGI(s) 118. A given PGI 118 can identify a corresponding physical group (PG) 124 of first memory 104, which can comprise substantially any positive integer, M, of PGs 124. Various blocks, and/or pages therein, in a given PG 124 can be grouped together in the PG 124 according to a defined striping profile 120.

L2P table 114 can further comprise a second set of logical group identifiers (LGIs), which can be referenced herein, either individually or collectively, as LGI(s) 116. A given LGI 116 can identify a logical group (LG), having M consecutive logical blocks, and/or pages therein, of data, that maps to a corresponding PG 124. Additional detail regarding logical and physical memory spaces can be found with reference to FIGS. 2A and 2B. Additional detail regarding striping profile 120 can be found in connection with FIG. 3.

Figure 2A:
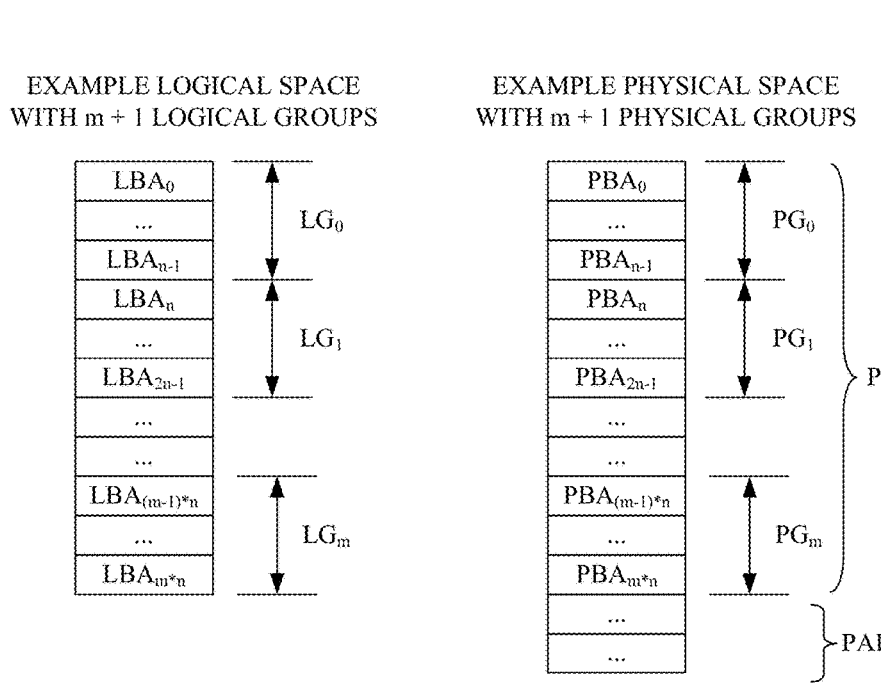
FIG. 2A illustrates an example block diagram illustrating various examples relating to logical and physical spaces in connection with L2P mapping in accordance with certain embodiments of this disclosure.

While still referring to FIG. 1, but turning now to FIG. 2A, block diagram 200A is presented. Block diagram 200A provides various examples relating to logical and physical spaces in connection with L2P mapping.

For purposes of reducing metadata and related overhead, in some embodiments, sequential logical block addresses (LBAs) can be combined together to form a logical group (LG). These sequential LBAs can be mapped to sequential physical page addresses (PPAs) and/or sequential physical block addresses (PBAs) locations in physical memory. These consecutive PPAs or PBAs in memory can form a physical group (PG). A PG 124 can be made up of consecutive PBAs and/or PPAs within a same chip or same bank or can be made up of locations across all the chips in a channel or can be made up of multiple chips across multiple channels, which is further detailed in connection with FIG. 3. In any case, the layout can be predefined and known such that only knowing the starting PBA or PPA of PG 124 is enough to find the location of any LBA mapped to the PG.

In this example, $LG_0$ can map to $PG_0$, $LG_1$ can map to $PG_1$, and so on. The collection of $LG_0$ through $LG_m$ can represent substantially of logical memory that can be mapped to $PG_0$ through $PG_m$, which can represent substantially all usable physical memory of first memory 104. This usable physical memory can be referred to as data partition 206. In some embodiments, first memory 104 can include other partitions 208, which is further detailed in connection with FIG. 5.

Figure 2B:
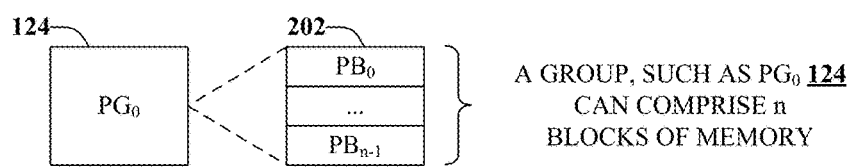
FIG. 2B illustrates an example block diagram illustrating example hierarchical views of a PG and a physical block in accordance with certain embodiments of this disclosure.
Figure 2B:
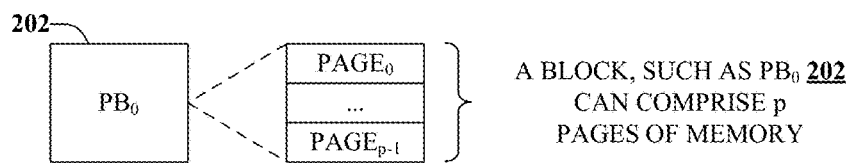

Referring now to FIG. 2B, block diagram 200B is presented. Block diagram 200B provides example hierarchical views of a PG and a physical block. As detailed, a PG (e.g., $PG_0$ 124) can comprise substantially any positive integer, n, physical blocks 202 of physical memory. A given physical block (e.g., $PB_0$ 202) can be addressed by a physical block address (e.g., $PBA_0$). In some embodiments, a PB 202 can represent about 4 kB of information. In some embodiments, PB 202 can represent about 512 bytes of information. However, since TTM can support small pages a given PB 202 can comprise substantially any positive integer, p, pages of memory. Although not depicted here, in some embodiments, a page can be larger than a block, in which case a page can comprise multiple blocks. For example, in some embodiments, the size of the block can correspond to a defined data size utilized by a host. Given that TTM can support substantially any suitable page size, in some cases it may be advantageous to have page sizes larger than the block size.

As an assumption, if the number of LBAs in LG (and, likewise, the number of PBAs or PPAs in a PG) is small enough, it can be assumed, in some embodiments, that wear within a PG 124 is mostly uniform. In other words, that all the PBAs within a PG 124 will experience approximately the same wear, and thus SWL at a granularity of a given group size is sufficient to efficiently utilized a TTM storage system.

From observation, this assumption is valid for certain workload types, namely, types such as mostly sequential workloads, mostly random workload across the whole storage capacity, mostly random workload across subset of storage capacity and many other workloads when number of PBAs in a PG 124 is less than about 256 4K LBAs. Hence, in some embodiments, a PG 124 can represent about one megabyte of data or less and can have fewer than or equal to 256 physical blocks (e.g., $n \leq 256$) of 4K block size.

In contrast to other embodiments in which a page is the same size as a block or there multiple blocks per page, in cases where there are multiple pages per block (as illustrated in FIG. 2B), stripping can stripe data across the pages of different memory devices that can belong to different PGs. Such can represent another example stripping profile.

Figure 3:
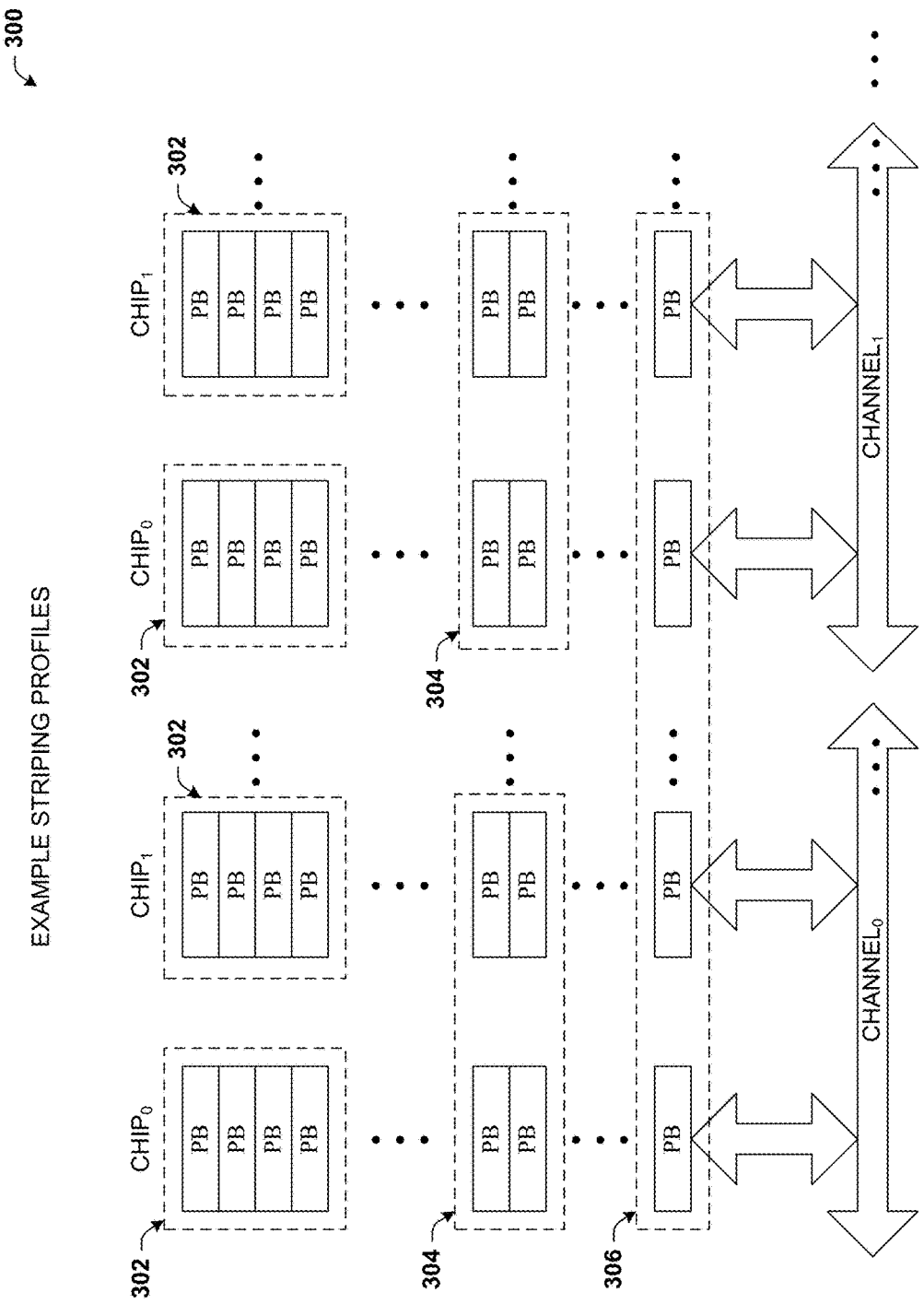
FIG. 3 depicts an example block diagram that illustrates various example striping profiles in accordance with certain embodiments of this disclosure.

While still referring to FIG. 1, but turning now as well to FIG. 3, block diagram 300 is presented. Block diagram 300 provides various example striping profiles. For example, reference numeral 302 depicts an example striping profile 120 in which all PBs of a PG are assigned to a single chip of memory, potentially on a single memory bank and potentially sequential. Reference numeral 304 depicts an example striping profile 120 in which a first portion of PBs are from a first chip (e.g., $CHIP_0$) and a second portion of the PBs are from a second chip (e.g., $CHIP_1$). In this example, both the first and second chips are accessed via the same channel (e.g., CHANNEL® or $CHANNEL_1$, etc.). Reference numeral 306 depicts an example striping profile 120 in which a single PG 124 spans multiple chips and multiple channels.

Continuing the discussion of FIG. 1, as noted, controller 102 can utilize L2P table 114 to map logical memory address 108 (e.g., an LBA) to physical memory address 110 (e.g., a PBA). It is understood that one or more copies of L2P table 114 (denoted as L2P table copy 128) can be stored in a non-volatile manner in first memory 104. Such can enable L2P table 114 to be restored in second memory 112 in the event of power failure or the like.

As also noted, knowing the starting PBA of a PG 124 is enough to find the location of any LBA mapped to the PG 124 based on a known striping profile 120 and vice versa. Such can be achieved according to the following. Upon receipt of a given LBA (e.g., logical memory address 108), a given LG can be identified by dividing the LBA by the number of LBAs per LG (e.g., n). Having determined the correct LG (identified by LGI 116), the corresponding PG can be readily identified based on striping profile 120 and other known data contained in L2P table. Having determined the correct PG 124 (e.g., identified by PGI 118), what remains is to determine offset 126 within the identified PG 124. Such can be accomplished by way of a modulo operation, e.g., a remainder of LBA divided by the number of LBAs per LG. For example, offset 126 can be LBA % n.

Figure 4:
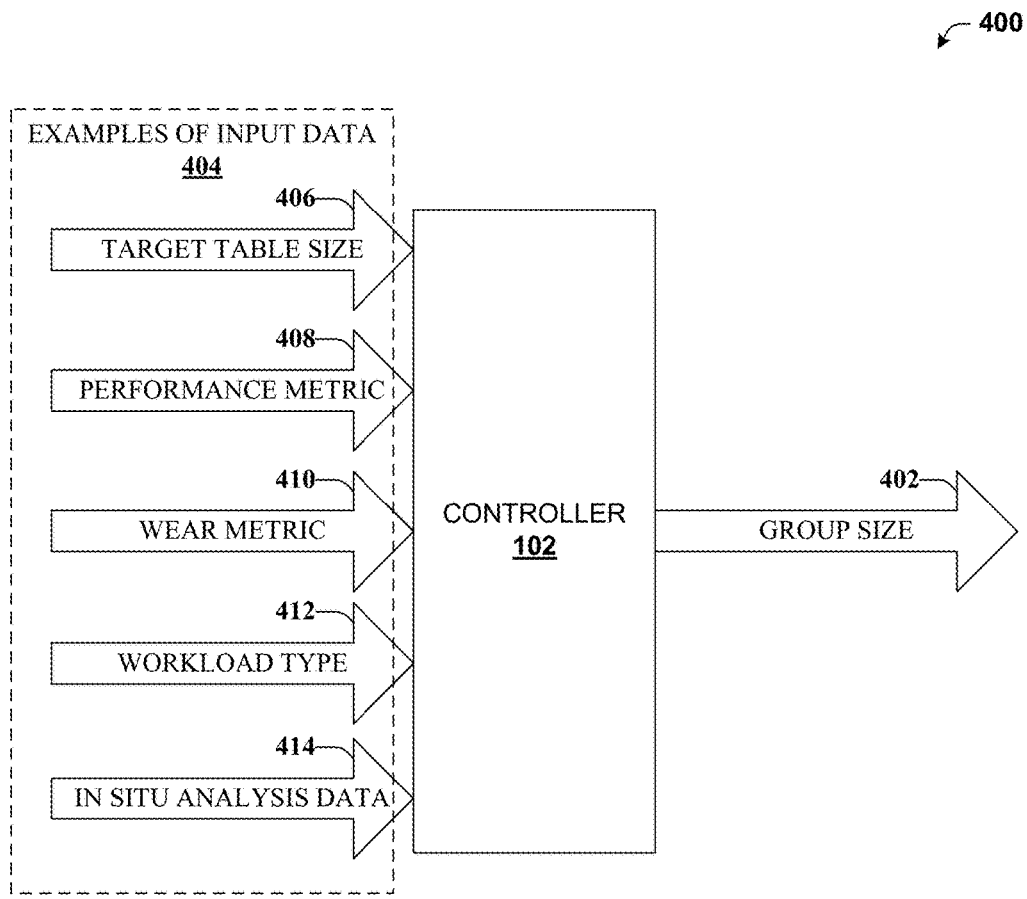
FIG. 4 depicts an example system illustrating various examples relating to a configurable group size in connection with L2P translation in accordance with certain embodiments of this disclosure.

Referring now to FIG. 4, system 400 is illustrated. System 400 depicts various examples relating to a configurable group size in connection with L2P translation. As previously discussed, group size 402 can be configurable. Group size 402 is used herein as a number of blocks (e.g., n) that are grouped together in the same LG or PG 124. Other metrics relating to size might also be used. In some embodiments, group size 402 can be determined and/or updated by controller 102 based on input data 404.

In some embodiments, input data 404 can represent a determined value that is determined to result in a target table size. Such is labeled here as reference numeral 406. It can be readily appreciated that a table size of L2P table 114 is a function of the number of groups. Grouping fewer blocks into a group can result in more groups (e.g., smaller group size 402 and larger table size), whereas grouping more blocks per group can result in fewer groups (e.g., larger group size 402 and smaller table size). In general, a smaller table size can be preferred as such can reduce overhead and/or satisfy various performance metrics 408. However, in order to reduce table size, group size 402 must increase. Generally, it is not desirable to increase group size 402 beyond the point in which wear (within a group) is not reasonably uniform as indicated by wear metric 410. Hence, target table size 406 can relate to data indicating an optimal or target table size that balances these competing influences (e.g., performance metric 408 vs. wear metric 410).

In some embodiments, input data 404 can represent a defined workload type 412. The defined workload type 412 can be a substantially sequential workload, a substantially random workload across substantially all PGs of the first memory, a substantially random workload across a subset of PGs of the first memory, or another suitable workload type 412. Group size 402 can be determined based on an expected workload type 412 e.g., to optimize or improve efficacy for the identified type.

In some embodiments, controller 102 can determine or update group size 402 in situ. For example, input data 404 can represent in situ analysis data 414 that can be collected by observing first memory 104 in operation. For instance, controller 102 can, based on in situ analysis data 414, determine that first memory 104 is operating according to a particular workload type 412 and then update group size 402 accordingly.

Figure 5:
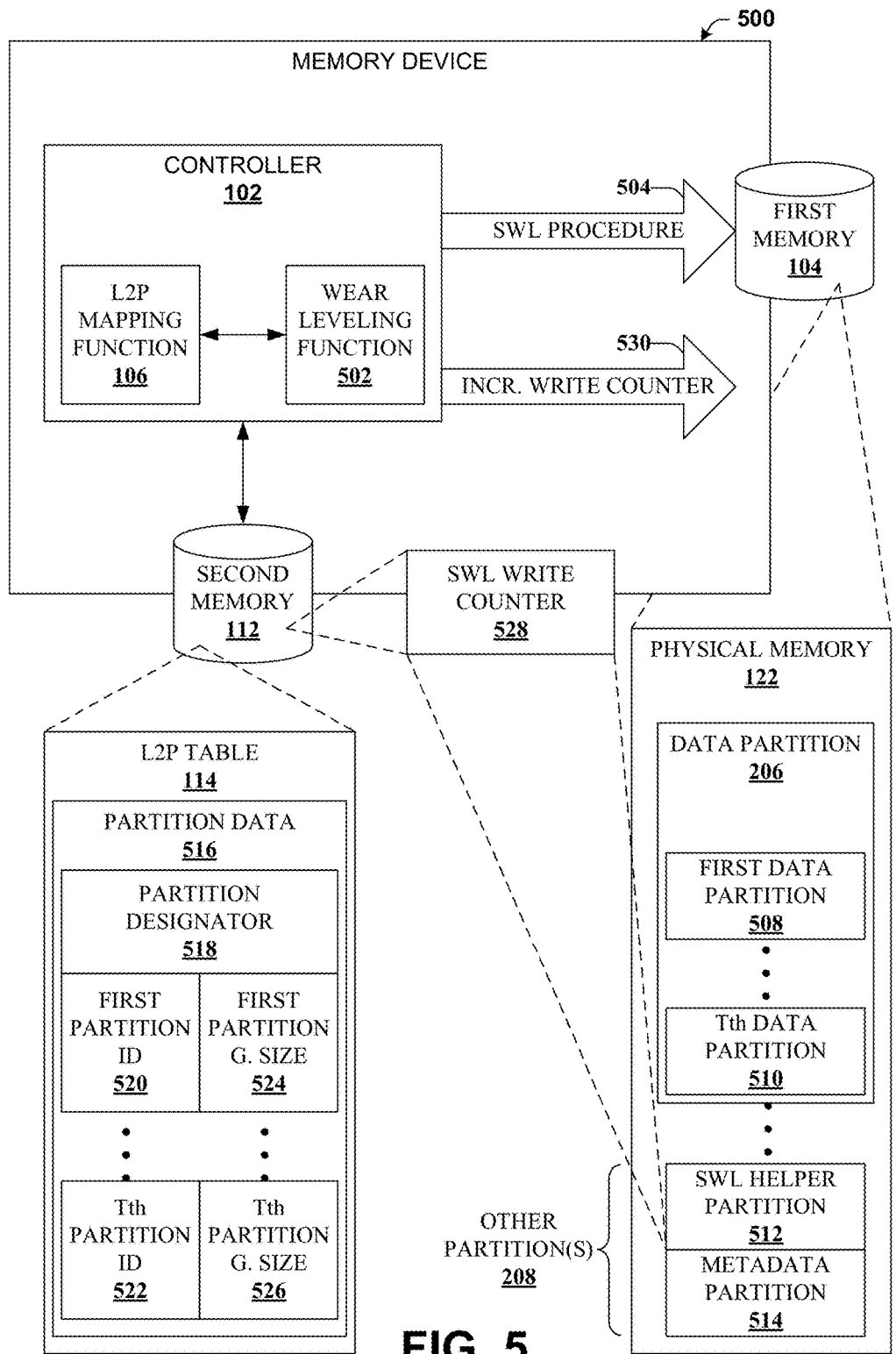
FIG. 5 illustrates an example memory device that provides for additional aspects or elements in connection with thin and efficient logical-to-physical (L2P) mapping in accordance with certain embodiments of this disclosure.

Turning now to FIG. 5, memory device 500 is illustrated. Memory device 500 can provide for additional aspects or elements in connection with thin and efficient logical-to-physical (L2P) mapping. For example, memory device 500 and/or controller 102 can employ L2P mapping function 106 to provide wear leveling function 502. As a result of wear leveling function 502, a static wear leveling procedure 504 can be performed on first memory 104.

As previously detailed, because first memory 104 can comprise TTM, which allows overwrite operations, DWL, garbage collection, and certain other memory management operations are not needed. However, first memory 104 can still benefit from static wear leveling, which can be referred to herein with reference to SWL procedure 504. SWL procedure 504 can operate to more evenly spread memory wear among the physical memory 122 (of first memory 104), which can improve memory endurance not only for data partition 206, but also for other partitions 208.

In some embodiments, data partition 206 can represent a single logical partition comprising all or substantially all usable memory (e.g., what is available to high-level applications for storage). Other partitions 208 can exist as well, with the caveat that memory allocated to these other partitions 208 reduces overall capacity of data partition 206.

Data partition 206 is typically the largest partition. Data partition 206 can comprise all PGs 124. Hence, if there are M LGs allocated for memory device 500 based on exposed capacity of the storage medium and no data reduction is employed, then there are M PGs 124 in data partition 206. Data partition 206 can be organize and managed in terms of PGs 124. Because PGs 124 are relatively large in size, management operations (e.g., L2P translation, wear-leveling, etc.) can be thin and efficient. Among other partitions 208, physical memory 122 can include an SWL helper partition 512, a metadata partition 514, or other suitable partitions.

In some embodiments, SWL helper partition 512 can be used as a temporary place holder while moving data during SWL procedure 504. SWL helper partition 512 can represent a relatively small partition in terms of size. The size of SWL helper partition 512 can be configurable and can be based on a number of parallel SWL operations to be supported by memory device 500 as well as other factors affecting wear. SWL helper partition 512 can be organized and managed in term of PGs 124. In some embodiments, metadata partition 514 can store metadata that is used for memory management operations such as SWL procedure 504. Metadata partition 514 can be relatively small and can be organized and managed in terms of TTM pages, which, as noted previously, can be smaller in size than conventional flash memory pages.

While data partition 206 has been described as a single logical partition, in some embodiments, data partition 206 can be logically divided into substantially any positive integer, T, partitions, which are exemplified by first data partition 508 and Tth data partition 510. Partitioning data partition 206 into multiple logical partitions (e.g., first data partition 508 through Tth data partition 510) can provide certain advantage, some of which are noted below. In those cases in which data partition 206 is further partitioned, L2P table 114 can comprise partition data 516.

Partition data 516 can comprise partition designator 518 that can indicate that data partition 206 is logically divided into multiple data partitions. In some embodiments, partition designator 518 can indicate the number (e.g., T) of logical partitions data partition 206 includes. In some embodiments, partition data 516 can comprise first partition identifier 520 and Tth partition identifier 522 that can identify a specific partition. As one example, a given PGI 118 that identifies a corresponding PG 124 can include a partition identifier (e.g., 520, 522) to indicate to which logical partition the PG 124 belongs.

In some embodiments, group size 402 can differ for different logical partitions. For example, suppose data partition 206 is divided into two logical partitions, 508 and 510. While a first group size can be uniform for all PGs 124 in partition 508, such can differ from a second group size that reflects group size 402 of partition 510. Hence, partition data 516 can comprise first partition group size data 524 that indicates a group size 402 of first data partition 508 and Tth partition group size data 526 that indicates a group size 402 of Tth partition 510. Group size data (e.g., 524, 526) can be the same or different and can be determined or updated independently. Moreover, such can be beneficial in that various logical partitions can be potentially optimized for the types of workloads that are individually witnessed in operation similar to what was described in connection with FIG. 4.

In some embodiments, second memory 112 can comprise SWL write counter 528. In some embodiments, a respective SWL write counter 528 can exist for each PG 124. In other words, if data partition 206 comprises M PGs 124, then M SWL write counters 528 can exist. SWL write counter 528 can represent a running tally of a number of times a corresponding PG 124 has been programmed (e.g., write operation, overwrite operation, or otherwise changes state). Hence, controller 102 can increment SWL write counter 528, which is represented by reference numeral 530. Incrementing 530 can be in response to a corresponding PG 124 being programmed. Since PG 124 represents a group of physical blocks and, in some cases, each physical block can comprise multiple pages, SWL write counter 528 can incremented in response to any page or any physical block being programmed, or even any bit or byte within a page being programmed to a different state.

SWL write counter 528 can be included in L2P table 114 or can be maintained in other portions of second memory 112. One or more backup or copy of SWL write counter(s) 528 can also exist first memory 104, such as in metadata partition 514.

Example Methods

The diagrams included herein are described with respect to interaction between several components, or memory architectures. It should be appreciated that such diagrams can include those components and architectures specified therein, some of the specified components/architectures, and/or additional components/architectures. Sub-components can also be implemented as electrically connected to other sub-components rather than included within a parent architecture. Additionally, it is noted that one or more disclosed processes can be combined into a single process providing aggregate functionality. For instance, a program process can comprise an erase process, or vice versa, to facilitate programming and erasing a semiconductor cell by way of a single process. In addition, it should be appreciated that respective rows of multiple cell memory architectures can be erased in groups (e.g., multiple rows erased concurrently) or individually. Moreover, it should be appreciated that multiple memory cells on a particular row can be programmed in groups (e.g., multiple memory cells programmed concurrently) or individually. Components of the disclosed architectures can also interact with one or more other components not specifically described herein but known by those of skill in the art.

Figure 6:
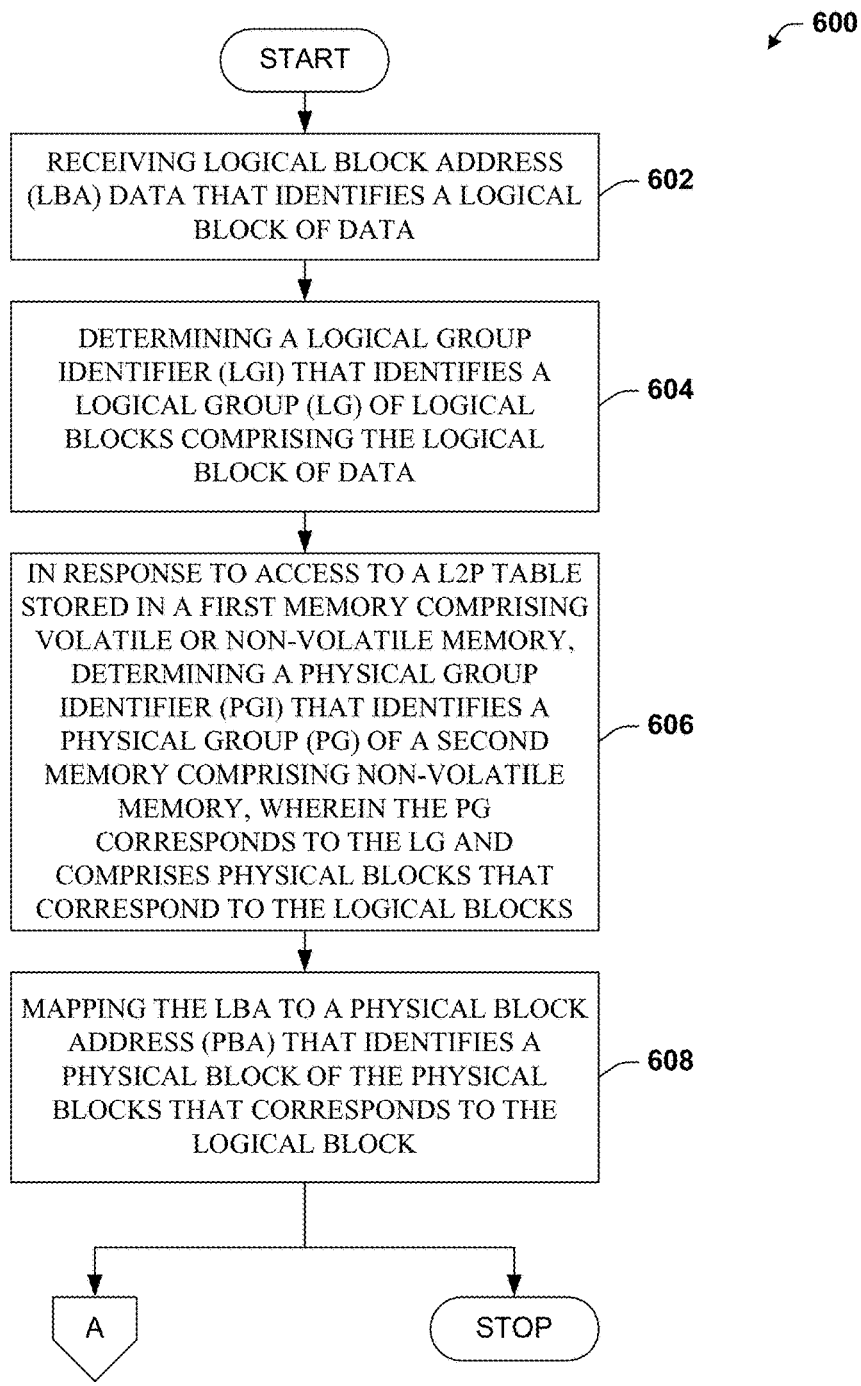
FIG. 6 illustrates an example methodology that can provide for a thin and efficient logical-to-physical (L2P) mapping in accordance with certain embodiments of this disclosure.
Figure 7:
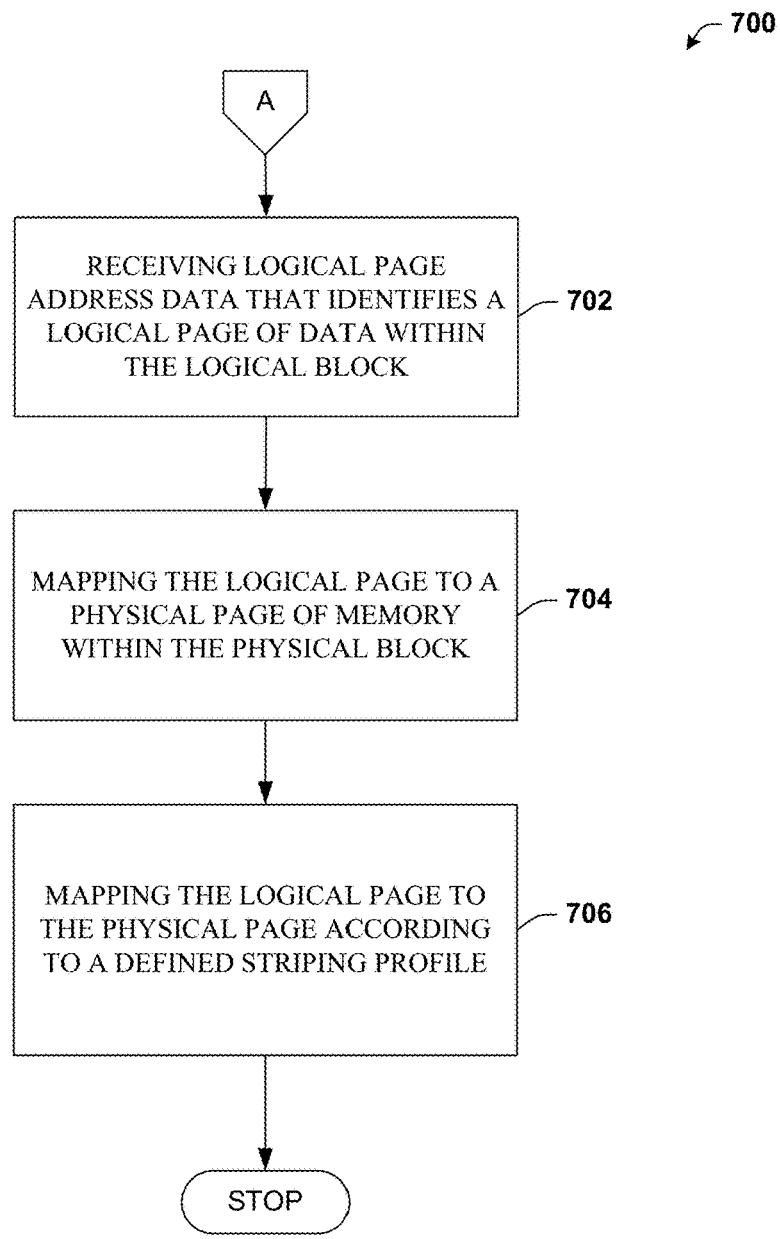
FIG. 7 illustrates an example methodology that can provide for additional aspects or elements in connection with thin and efficient L2P mapping in accordance with certain embodiments of this disclosure.

In view of the exemplary diagrams described supra, process methods that can be implemented in accordance with the disclosed subject matter will be better appreciated with reference to the flow charts of FIGS. 6-7. While for purposes of simplicity of explanation, the methods of FIGS. 6-7 are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additionally, it should be further appreciated that the methods disclosed throughout this specification are capable of being stored on an article of manufacture to facilitate transporting and transferring such methodologies to an electronic device. The term article of manufacture, as used, is intended to encompass a computer program accessible from any computer-readable device, device in conjunction with a carrier, or storage medium.

Referring now to FIG. 6, exemplary method 600 is illustrated. Method 600 can provide for a thin and efficient logical-to-physical (L2P) mapping according to some embodiments of the disclosed subject matter. For example, at reference numeral 602, a controller, processor, or other suitable device can receive logical block address (LBA) data. The LBA data can identify a logical block of data. For example, a block of data received from a host device.

At reference numeral 604, the processor can determine a logical group identifier (LGI). The LGI can identify a logical group (LG) of logical blocks comprising the logical block of data received at reference numeral 602. For example, in response to receiving the logical block, the processor can determine the LGI associated with an LG to which the logical block of data belongs.

At reference numeral 606, the processor can determine a physical group identifier (PGI). In some embodiments, the PGI can be identified in response to access to an L2P table stored in a first memory. The first memory can comprise either volatile or non-volatile memory, e.g., depending on the particular implementation. The PGI can identify a physical group (PG) of a second memory. The second memory can comprise non-volatile memory. For instance, the second memory can comprise two-terminal non-volatile memory. In some embodiments, the PG corresponds to the LG. For example, the PG can be a physical portion of the second memory that is mapped to a logical group of data (e.g., received from a host) that includes the logical block of data. Said differently, the PG can comprise physical blocks of memory that correspond to the logical blocks of memory.

At reference numeral 608, the processor can map the LBA to a physical block address (PBA). The PBA can identify a physical block of the physical blocks that corresponds to the logical block. Method 600 can end or proceed to insert A, which is further detailed in connection with FIG. 7.

Turning now to FIG. 7, exemplary method 700 is illustrated. Method 700 can provide for additional aspects or elements in connection with thin and efficient L2P mapping according to some embodiments of the disclosed subject matter. For example, at reference numeral 702, the controller, processor, or other suitable device can receive logical page address (LPA) data. The LPA data can identify a logical page of data within the physical block.

At reference numeral 702, the processor can map the logical page to a physical page of memory within the physical block. As one example, the logical page can be assigned to a particular location within a logical block and the physical page of memory can be assigned to a similar location of a corresponding physical block of memory.

At reference numeral 704, the mapping described in connection with reference numeral 702 can be provided according to a defined striping profile. For example, the striping profile can be one in which all PBs of a PG are assigned to a single chip of memory, potentially on a single memory bank and potentially sequential. As another example, the striping profile can be one in which a first portion of PBs are from a first chip and a second portion of the PBs are from a second chip. In some embodiments, both the first and second chips can be accessed via the same channel. In other embodiments, the striping profile can be one in which a single PG spans multiple chips and multiple channels.

Example Operating Environments

Figure 8:
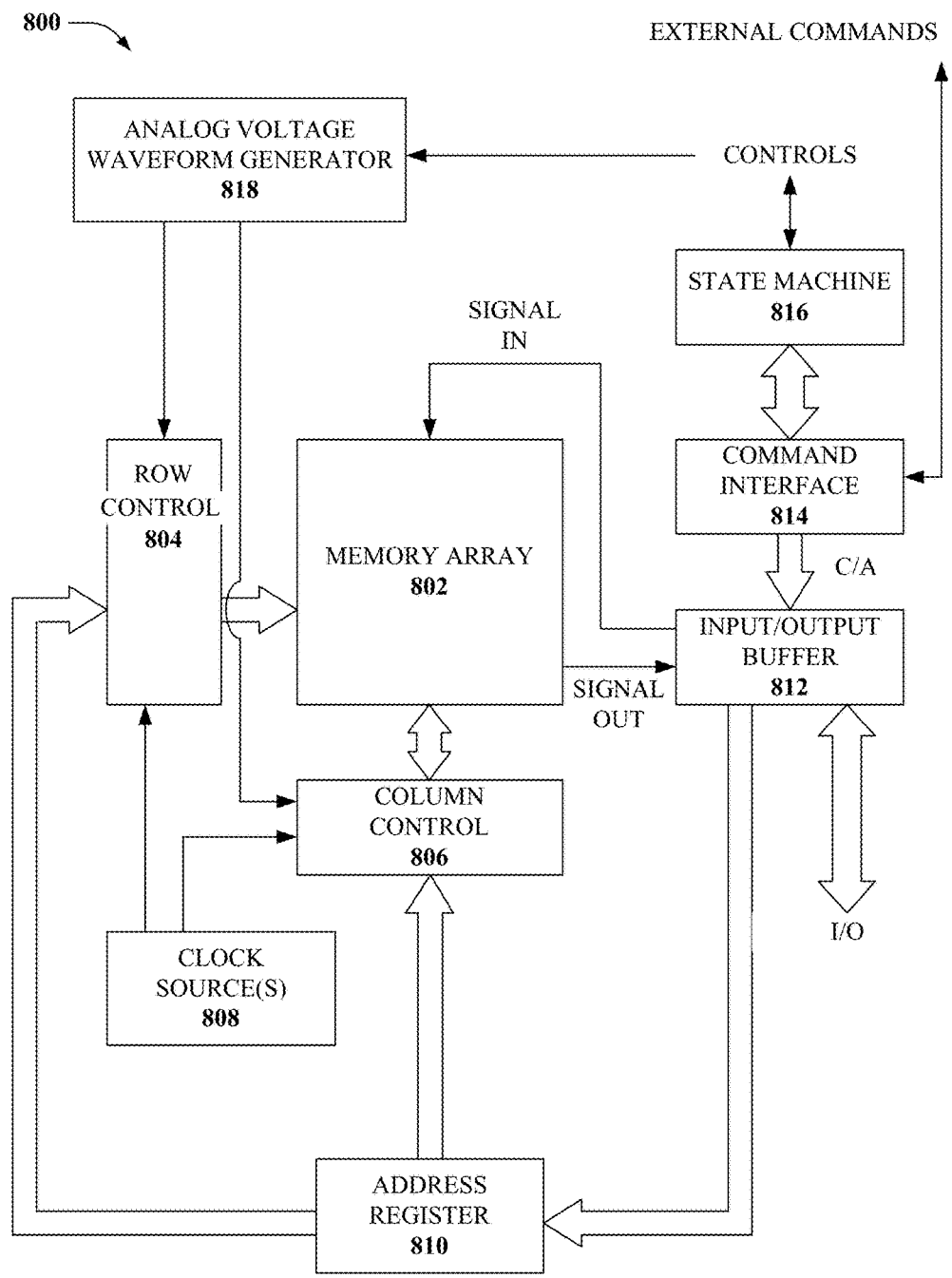
FIG. 8 illustrates a block diagram of an example electronic operating environment in accordance with certain embodiments of this disclosure.

FIG. 8 illustrates a block diagram of an example operating and control environment 800 for a memory cell array 802 according to aspects of the subject disclosure. In at least one aspect of the subject disclosure, memory cell array 802 can comprise a variety of memory cell technology. Particularly, memory cell array 802 can comprise two-terminal memory such as resistive memory cells with a non-volatile memory device and a volatile selector device, as described herein.

A column controller 806 can be formed adjacent to memory cell array 802. Moreover, column controller 806 can be electrically coupled with bit lines of memory cell array 802. Column controller 806 can control respective bitlines, applying suitable program, erase or read voltages to selected bitlines.

In addition, operating and control environment 800 can comprise a row controller 804. Row controller 804 can be formed adjacent to column controller 806, and electrically connected with word lines of memory cell array 802. Row controller 804 can select particular rows of memory cells with a suitable selection voltage. Moreover, row controller 804 can facilitate program, erase or read operations by applying suitable voltages at selected word lines.

A clock source(s) 808 can provide respective clock pulses to facilitate timing for read, write, and program operations of row control 804 and column control 806. Clock source(s) 808 can further facilitate selection of word lines or bit lines in response to external or internal commands received by operating and control environment 800. An input/output buffer 812 can be connected to an external host apparatus, such as a computer or other processing device (not depicted) by way of an I/O buffer or other I/O communication interface. Input/output buffer 812 can be configured to receive write data, receive an erase instruction, output readout data, and receive address data and command data, as well as address data for respective instructions. Address data can be transferred to row controller 804 and column controller 806 by an address register 810. In addition, input data is transmitted to memory cell array 802 via signal input lines, and output data is received from memory cell array 802 via signal output lines. Input data can be received from the host apparatus, and output data can be delivered to the host apparatus via the I/O buffer.

Commands received from the host apparatus can be provided to a command interface 814. Command interface 814 can be configured to receive external control signals from the host apparatus, and determine whether data input to the input/output buffer 812 is write data, a command, or an address. Input commands can be transferred to a state machine 816.

State machine 816 can be configured to manage programming and reprogramming of memory cell array 802. State machine 816 receives commands from the host apparatus via input/output interface 812 and command interface 814, and manages read, write, erase, data input, data output, and like functionality associated with memory cell array 802. In some aspects, state machine 816 can send and receive acknowledgments and negative acknowledgments regarding successful receipt or execution of various commands.

In an embodiment, state machine 816 can control an analog voltage waveform generator 818 that provides read/write and program/erase signals to row control 804 and column control 806.

To implement read, write, erase, input, output, etc., functionality, state machine 816 can control clock source(s) 808. Control of clock source(s) 808 can cause output pulses configured to facilitate row controller 804 and column controller 806 implementing the particular functionality. Output pulses can be transferred to selected bit lines by column controller 806, for instance, or word lines by row controller 804, for instance.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more IC chips. For example, in one embodiment, a set of components can be implemented in a single IC chip. In other embodiments, one or more respective components are fabricated or implemented on separate IC chips.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
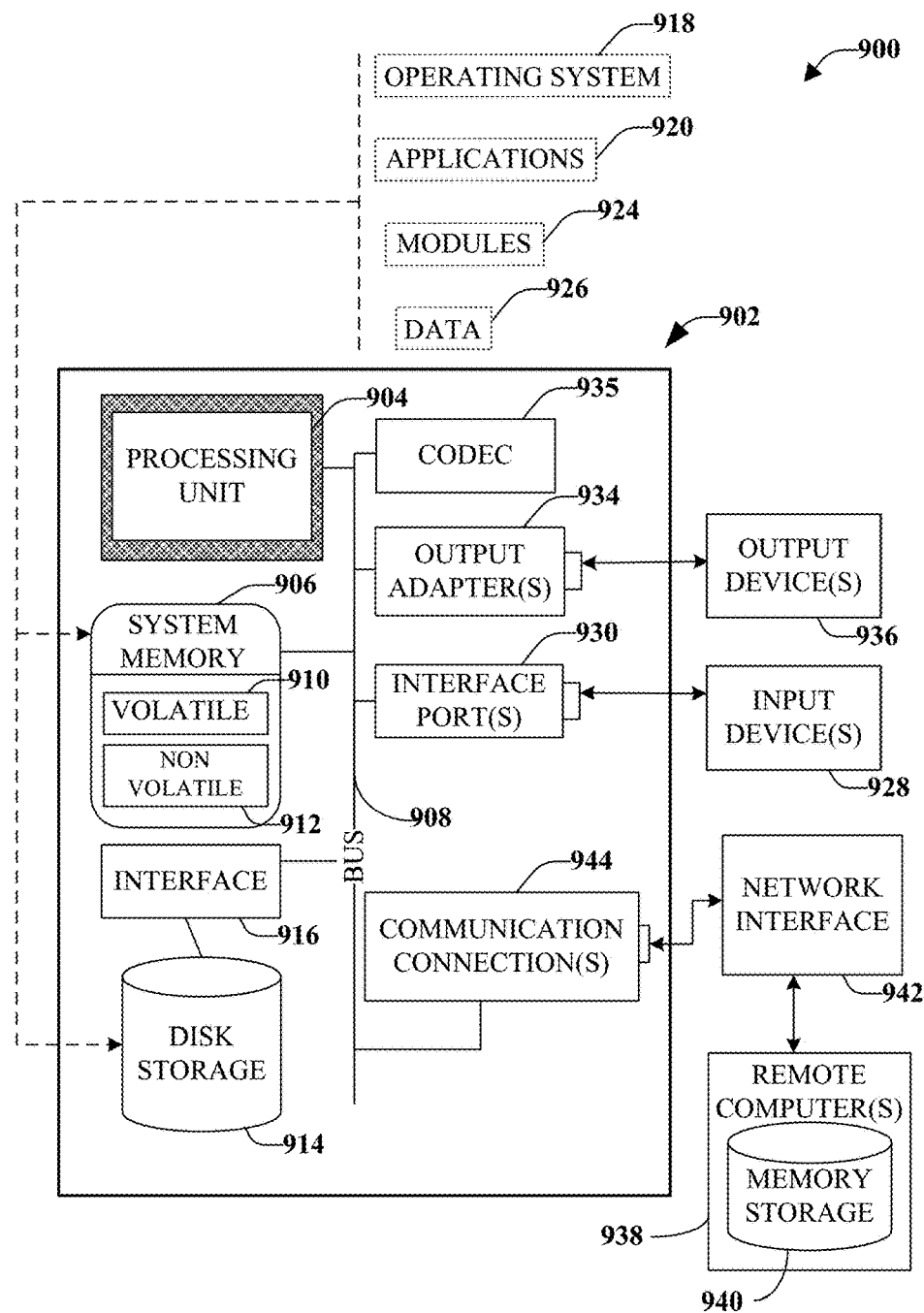
FIG. 9 illustrates a block diagram of an example computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or Flash memory. Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ES-DRAM) and so forth.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 or transmitted to the server or application. The user can be provided the opportunity to opt-in or opt-out of having such information collected or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, replicating, mimicking, determining, or transmitting, and the like, refer to the action and processes of processing systems, and/or similar consumer or industrial electronic devices or machines, that manipulate or transform data or signals represented as physical (electrical or electronic) quantities within the circuits, registers or memories of the electronic device(s), into other data or signals similarly represented as physical quantities within the machine or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A memory device, comprising:
 a controller, operatively coupled to a first memory comprising an array of non-volatile two-terminal memory cells, wherein the controller provides logical-to-physical (L2P) mapping in response to translating a first memory address, characterized as a logical address, to a second memory address, characterized as a physical address of the first memory; and a second memory comprising volatile or non-volatile memory that stores an L2P table, wherein the L2P table comprises:

a first set of physical group identifiers,
wherein a physical group identifier (PGI) of the set of PGIs identifies a physical group (PG) of the first memory, wherein the PG has a group size characterized as a number of blocks in the PG, and wherein the blocks in the PG are grouped according to a defined striping profile, wherein the defined striping profile comprises a first striping profile that assigns a first portion of the blocks in the PG to a first memory chip of the first memory and a second portion of the blocks in the PG to a second memory chip of the first memory; and wherein a second PGI of the set of PGIs identifies a second physical group (second PG) having a second group size in which blocks of the second PG are grouped according to a second defined striping profile, the second defined striping profile is selected from a group consisting of:
a first of the second defined striping profile in which a first portion of the blocks of the second PG are assigned to the first memory chip and a second portion of the blocks of the second PG are assigned to the second memory chip,
a second of the second defined striping profile in which all blocks of the second PG are assigned to a single memory bank of the first memory,
a third of the second defined striping profile in which the first portion of the blocks of the second PG are assigned to a first bank of the first memory chip and the second portion of the blocks of the second PG are assigned to a second bank of the first memory chip, and
a fourth of the second defined striping profile in which the first portion of the blocks of the second PG are assigned to a third memory chip of the first memory that is coupled to a first channel and the second portion of the blocks of the second PG are assigned to a fourth memory chip of the first memory that is coupled to a second channel; and a second set of logical group identifiers that map to the first set of PGIs, wherein a logical group identifier (LGI) of the set of LGIs identifies a logical group (LG) having a number of consecutive logical blocks of data.

2. The memory device of claim 1, wherein the group size is configurable and the controller determines a value of the group size based on input data.

3. The memory device of claim 2, wherein the input data represents a determined value that is determined to result in a table size, representative of a size of the L2P table, that is less than a first threshold and further results in the controller determining the value of the group size to be greater than a second threshold, wherein the first threshold relates to a performance metric determined as a function of the table size, and wherein the second threshold relates to a wear metric relating to a uniformity of memory wear within a PG having the group size.

4. The memory device of claim 2, wherein the input data represents a defined workload type representative of a type of workload applied to the first memory.

5. The memory device of claim 4, wherein the controller determines or updates the defined workload type based on an analysis of a workload on the first memory in operation.

6. The memory device of claim 4, wherein the defined workload type is selected from a group consisting of: a substantially sequential workload, a substantially random workload across substantially all PGs of the first memory, and a substantially random workload across a subset of PGs of the first memory.

7. The memory device of claim 1, wherein the L2P table comprises partition data representing a designation that a data partition of the first memory is logically divided into multiple data partitions.

8. The memory device of claim 7, wherein the PGI comprises a first partition identifier that indicates the PG identified by the PGI is in a first partition of the multiple data partitions, and wherein a second PGI of the set of PGIs comprises a second partition identifier that indicates a second PG identified by the second PGI is in a second partition of the multiple data partitions.

9. The memory device of claim 8, wherein the group size of the PG in the first partition of the first memory differs from a second group size of the second PG in the second partition of the first memory.

10. The memory device of claim 9, wherein the controller determines or updates the group size of PGs in the first partition independently of determining or updating the second group size of PGs in the second partition.

11. The memory device of claim 1, wherein, in response to input of a logical block address (LBA) identifier of the LGI, the controller determines a physical block address (PBA) identifier that corresponds to the PGI based on the L2P table and the defined striping profile.

12. The memory device of claim 1, wherein the first memory comprises a copy of the L2P table and the controller updates the copy stored in the first memory in response to updates to the L2P table stored in the second memory.

13. The memory device of claim 1, wherein the controller employs the L2P table to perform a wear leveling procedure.

14. The memory device of claim 13, wherein the wear leveling procedure comprises incrementing a write counter of the PG in response to a data write that writes to a page of memory of the PG.

15. The memory device of claim 1, wherein a block of the blocks in the PG comprises one or more pages.

16. The memory device of claim 1, wherein the first memory is monolithically integrated into the controller.

17. A method, comprising:
receiving, by a processor, logical block address (LBA) data that identifies a logical block of data;
determining, by the processor, a logical group identifier (LGI) that identifies a logical group (LG) of logical blocks comprising the logical block of data;
in response to access to a L2P table stored in a first memory comprising volatile or non-volatile memory, determining, by the processor, a physical group identifier (PGI) that identifies a physical group (PG) of a second memory comprising non-volatile memory, wherein the PG corresponds to the LG and comprises physical blocks that correspond to the logical blocks;
mapping, by the processor and according to a defined striping profile, the LBA to a physical block address (PBA) that identifies a physical block of the physical blocks that corresponds to the logical block; wherein the defined striping profile causes the processor to map the LBA to a first memory chip of the first memory in response to the physical block being a member of a first portion of the physical blocks, and causes the processor to map the LBA to a second memory chip of the first memory in response to the physical block being a member of a second portion of the physical blocks;

receiving, by the processor, a second LBA that identifies a second logical block of data;

determining, by the processor, a second LGI that identifies a second LG of second logical blocks comprising the second logical block of data;

in response to a second access to the L2P table, determining, by the processor, a second PGI that identifies a second PG of the second memory, wherein the second PG corresponds to the second LG and comprises second physical blocks that correspond to the second logical blocks; and mapping, by the processor and according to a second defined striping profile, the second LBA to a second PBA that identifies a physical block of the second physical blocks that correspond to the second logical blocks, wherein the second defined striping profile is selected from a group consisting of:
- a first of the second defined striping profile in which a first portion of the second physical blocks of the second PG are assigned to the first memory chip and a second portion of the second physical blocks of the second PG are assigned to the second memory chip,
- a second of the second defined striping profile in which all of the second physical blocks of the second PG are assigned to a single memory bank of the first memory,
- a third of the second defined striping profile in which the first portion of the second physical blocks of the second PG are assigned to a first bank of the first memory chip and the second portion of the second physical blocks of the second PG are assigned to a second bank of the first memory chip, and
- a fourth of the second defined striping profile in which the first portion of the second physical blocks of the second PG are assigned to a third memory chip of the first memory that is coupled to a first channel and the second portion of the second physical blocks of the second PG are assigned to a fourth memory chip of the first memory that is coupled to a second channel.

18. The method of claim 17, further comprising:

receiving, by the processor, logical page address data that identifies a logical page of data within the logical block; and mapping, by the processor, the logical page to a physical page of memory within the physical block.

19. The method of claim 17, further comprising:

receiving input data associated with a performance metric determined as a function of a table size of the L2P table;

determining a group size of the L2P table at least in part from the input data and further in part from a wear metric relating to a uniformity of memory wear within the first memory; and selecting a number of the physical blocks, including the first portion of the physical blocks and the second portion of the physical blocks, at least in part from the determined group size.

* * * * *